United States Patent
Jeong

(10) Patent No.: US 9,189,274 B2
(45) Date of Patent: Nov. 17, 2015

(54) APPARATUS AND METHOD FOR PREDICTING PERFORMANCE ATTRIBUTABLE TO PARALLELIZATION OF HARDWARE ACCELERATION DEVICES

(71) Applicant: ELECTRONICS AND TELECOMMUNICATIONS RESEARCH INSTITUTE, Daejeon (KR)

(72) Inventor: Jin-Hwan Jeong, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 288 days.

(21) Appl. No.: 13/953,993

(22) Filed: Jul. 30, 2013

(65) Prior Publication Data

US 2014/0173608 A1    Jun. 19, 2014

(30) Foreign Application Priority Data

Dec. 14, 2012 (KR) .................. 10-2012-0146900

(51) Int. Cl.
G06F 9/46 (2006.01)
G06F 9/48 (2006.01)

(52) U.S. Cl.
CPC ........ *G06F 9/4887* (2013.01); *G06F 2209/483* (2013.01); *G06F 2209/5017* (2013.01); *G06F 2209/5019* (2013.01)

(58) Field of Classification Search
None
See application file for complete search history.

(56) References Cited

U.S. PATENT DOCUMENTS

2007/0130568 A1    6/2007  Jung et al.
2013/0191843 A1*   7/2013  Sarkar et al. .................. 718/105

FOREIGN PATENT DOCUMENTS

KR    1020070059837 A    6/2007
KR    10-0463642 B1     12/2007

OTHER PUBLICATIONS

Mark D. Hill, et al; "Amdahl's Law in the Multicore Era" Published by the IEEE Computer Society, Jul. 2008; 6 pages.
Hao Shen, et al; "Using Amdahl's Law for Performance Analysis of Many-Core SoC Architectures Based on Functionally Asymmetric Processors" Architecture of Computing Systems—ARCS 2011 Lecture Notes in Computer Science, vol. 6566, pp. 38-49; Feb. 2011.

* cited by examiner

*Primary Examiner* — Adam Lee
(74) *Attorney, Agent, or Firm* — Ladas & Parry LLP

(57) ABSTRACT

Disclosed herein are an apparatus and method for predicting performance attributable to the parallelization of hardware acceleration devices. The apparatus includes a setting unit, an operation unit, and a prediction unit. The setting unit divides the time it takes to perform a task into a plurality of task stages and processing stages, and sets one of a parallelization index and target performance. The operation unit calculates the times it takes to perform the stages, and calculates at least one of the ratio of a target parallelization stage in the task and a speed improvement value. The prediction unit calculates an expected performance value or a parallelization index based on at least one of the calculated times it takes to perform the stages, the calculated ratio of the target parallelization stage, the calculated speed improvement value, and the set target performance.

20 Claims, 4 Drawing Sheets

APPARATUS AND METHOD FOR PREDICTING PERFORMANCE ATTRIBUTABLE TO PARALLELIZATION OF HARDWARE ACCELERATION DEVICES

CROSS REFERENCE TO RELATED APPLICATION

This application claims the benefit of Korean Patent Application No. 10-2012-0146900, filed on Dec. 14, 2012, which is hereby incorporated by reference in its entirety into this application.

BACKGROUND OF THE INVENTION

1. Technical Field

The present invention relates generally to an apparatus and method for predicting performance attributable to the parallelization of hardware acceleration devices and, more particularly, to an apparatus and method for predicting performance attributable to the parallelization of hardware acceleration devices, which are capable of predicting the degree of improved performance when a task is performed in a parallel manner using hardware acceleration devices in a real-time processing system. That is, the present invention relates to an apparatus and method for predicting performance attributable to the parallelization of hardware acceleration devices, which are capable of predicting central process unit (CPU)-based software execution a versus the degree of improved performance when the execution of software is parallelized using general-purpose multi-core hardware acceleration devices, such as field programmable gate arrays (FPGAs), many integrated cores (MICs), or graphics processing units (GPUs).

2. Description of the Related Art

A conventional real-time data processing system employs a method of processing software based on a central processing unit (CPU). As the use of real-time data has explosively increased recently, a problem arises in that the performance of processing real-time data is reduced when only a conventional real-time data processing system is used.

In order to solve this problem, a real-time data processing system adopts a method of parallelizing software processing using hardware acceleration devices, such as FPGAs, MICs, or GPUs. For example, Korean Patent No. 10-0463642 (entitled ""Apparatus for accelerating Multimedia Processing using Coprocessor"") discloses an acceleration apparatus for performing multimedia processing in order to improve the processing performance of multimedia by performing parallelization processing.

A real-time data processing system using hardware acceleration devices contrives to improve overall performance in such a manner as to modularize the parts of the entire task that can be easily parallelized and then execute the modules through parallel processing using the hardware acceleration devices. That is, the parts that should be sequentially performed are performed by a high-speed CPU using a software method, and the parts that can be parallelized are performed by the hardware acceleration devices.

It is, however, difficult to predict an improvement in performance (i.e., acceleration) attributable to parallelization if an appropriate level of parallelization is not performed by hardware acceleration devices because a CPU typically has the fastest processing speed among hardware elements. In other words, the time it takes to perform the entire task may become faster or slower depending on the number of modules of the entire task that have been parallelized and the degree of parallel processing that is performed by the parallelized modules.

In order to improve task performance, it is possible to perform parallel processing using as many hardware acceleration devices as possible. In this case, problems arise in that the hardware acceleration devices occupy an excessively large area and high expenses are incurred.

A conventional parallelization processing method using hardware acceleration devices will now be described. A system designer determines parts of the entire task to be parallelized based on his or her experience. The system designer determines a task flow so that the parts determined to be parallelized are performed by the hardware acceleration devices and the remaining parts are performed by a CPU. A real-time data processing system actually performs data processing in accordance with the determined task flow, and the system designer checks the degree of improved performance attributable to parallelization based on the actual data processing of the real-time data processing system.

This conventional method greatly depends on the experience of a system designer in order to determine a task flow required for the parallelization processing of the task, and requires a lot of time to form parallelization processing using the hardware acceleration devices.

However, the performance of parallelization processing using hardware acceleration devices can be determined only when actual implementation has been completed. Accordingly, if existing hardware acceleration devices are designed again or replaced with new hardware acceleration devices because of design errors or an insufficient improvement in performance, a problem arises in that a development period increases because the stages from a design stage to a final implementation stage should be repeated. That is, although a lot of time and effort should be invested in order to construct parallelization processing using hardware acceleration devices, an expected effect cannot be previously predicted, and an actual test can be performed and the performance of parallelization processing can be measured only in the final stage. As a result, problems arise in that a lot of time is required to check the performance of parallelization processing and a lot of time and effort are repeatedly wasted in order to modify the configuration of parallelization processing and to measure the performance.

SUMMARY OF THE INVENTION

Accordingly, the present invention has been made keeping in mind the above problems occurring in the prior art, and an object of the present invention is to provide an apparatus and method for predicting performance attributable to the parallelization of hardware acceleration devices, which are capable of predicting an improvement in performance attributable to parallelization processing using hardware acceleration devices during a design stage. That is, the present invention provides an apparatus and method for predicting performance attributable to the parallelization of hardware acceleration devices, which are capable of predicting an improvement in performance attributable to parallelization processing using hardware acceleration devices during a design stage, thereby minimizing wastes of time and efforts that are required to design again.

In accordance with an aspect of the present invention, there is provided an apparatus for predicting performance attributable to parallelization of hardware acceleration devices, including a setting unit configured to divide the time it takes to perform a task into a plurality of task stages and a plurality of processing stages based on a target module to be parallelized, and to set one of a parallelization index and target performance; an operation unit configured to calculate the time it takes to perform each of the plurality of task stages and the plurality of processing stages, and to calculate at least one of the ratio of a target parallelization stage in the task and a speed improvement value based on the calculated times; and a prediction unit configured to calculate an expected performance value or a parallelization index based on at least one of the calculated the times it takes to perform the plurality of task stages and the plurality of processing stages, the calculated ratio of the target parallelization stage, the calculated speed improvement value, and the set target performance.

The operation unit may calculate the ratio of the target parallelization stage in the task based on the calculated times it takes to perform the plurality of task stages.

The operation unit may calculate the speed improvement value based on the set parallelization index and the previously calculated times it takes to perform the plurality of processing stages.

The prediction unit may calculate the expected performance value based on the calculated ratio of the target parallelization stage and the calculated speed improvement value.

The prediction unit may calculate the parallelization index based on the calculated times it takes to perform the plurality of processing stages, the calculated ratio of the target parallelization stage, and the set target performance.

The setting unit may divide the time it takes to perform the task into the plurality of task stages, including a pre-parallelization stage, a parallelization stage, and a post-parallelization stage.

The setting unit may divide the parallelization stage into the plurality of processing stages, including an initialization stage, a performance stage, and a post-processing stage.

The setting unit may set the number of hardware acceleration devices that process the target parallelization stage as the parallelization index.

In accordance with another aspect of the present invention, there is provided a method of predicting performance attributable to parallelization of hardware acceleration devices, including dividing, by a setting unit, the time it takes to perform a task into a plurality of stages based on a target module to be parallelized; calculating, by an operation unit, the time it takes to perform each of the plurality of divided stages; calculating, by the operation unit, the ratio of a target parallelization stage in the task based on the calculated times it takes to perform the plurality of stages; setting, by the setting unit, a parallelization index; calculating, by the operation unit, calculating a speed improvement value based on the set parallelization index and the times it takes to perform the plurality of stages; and calculating, by a prediction unit, an expected performance value based on the calculated ratio of the target parallelization stage in the task and the calculated speed improvement value.

Dividing the time it takes to perform the task into the plurality of stages may include dividing, by the setting unit, the time it takes to perform the task into a plurality of task stages, including a pre-parallelization stage, a parallelization stage, and a post-parallelization stage based on the target module to be parallelized.

Calculating the ratio of the target parallelization stage may include calculating, by the operation unit, the ratio of the target parallelization stage in the task based on the time it takes to perform the pre-parallelization stage, the time it takes to perform the parallelization stage, and the time it takes to perform the post-parallelization stage.

Dividing the time it takes to perform the task into the plurality of stages may include dividing, by the setting unit, the target parallelization stage into a plurality of processing stages, including an initialization stage, a performance stage, and a post-processing stage.

Calculating the speed improvement value may include calculating, by the operation unit, the speed improvement value based on the time it takes to perform the initialization stage, the time it takes to perform the performance stage, the time it takes to perform the post-processing stage, and the set parallelization index.

Setting the parallelization index may include setting, by the setting unit, the number of hardware acceleration devices that perform the target parallelization stage of the plurality of divided stages as the parallelization index.

Calculating the expected performance value may include calculating, by the prediction unit, the expected performance value by substituting the calculated ratio of the target parallelization stage and the calculated speed improvement value into Amdahl's law.

In accordance with still another aspect of the present invention, there is provided a method of predicting performance attributable to parallelization of hardware acceleration devices, including dividing, by a setting unit, a time it takes to perform a task into a plurality of stages based on a target module to be parallelized; calculating, by an operation unit, a time it takes to perform each of the plurality of divided stages; calculating, by the operation unit, a ratio of a target parallelization stage in the task based on the calculated times it takes to perform the plurality of stages; setting, by the setting unit, target performance; and calculating, by a prediction unit, a parallelization index based on the set target performance, the calculated times it takes to perform the stages, and the calculated ratio of the target parallelization stage.

Dividing the time it takes to perform the task into the plurality of stages may include dividing, by the setting unit, the time it takes to perform the task into a plurality of task stages, including a pre-parallelization stage, a parallelization stage, and a post-parallelization stage, based on the target module to be parallelized.

Calculating the ratio of the target parallelization stage may include calculating, by the operation unit, the ratio of the target parallelization stage in the task based on the time it takes to perform the pre-parallelization stage, the time it takes to perform the parallelization stage, and the time it takes to perform the post-parallelization stage.

Dividing the time it takes to perform the task into the plurality of stages may include dividing, by the setting unit, the target parallelization stage into a plurality of processing stages, including an initialization stage, a performance stage, and a post-processing stage.

Calculating the parallelization index may include calculating, by the prediction unit, the parallelization index by substituting the time it takes to perform the initialization stage, the time it takes to perform the performance stage, the time it takes to perform the post-processing stage, the ratio of the target parallelization stage, and the target performance into Amdahl's law.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
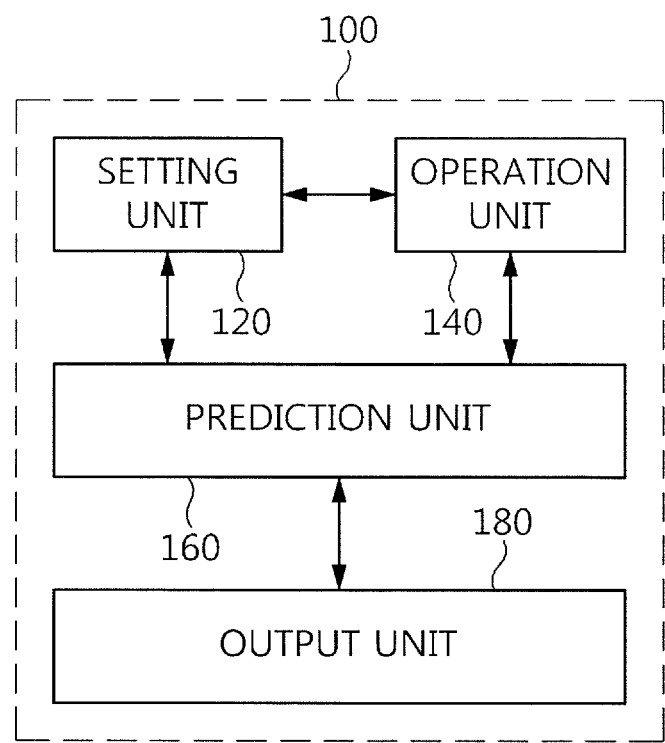
FIG. 1 is a block diagram illustrating an apparatus for predicting performance attributable to the parallelization of hardware acceleration devices in accordance with an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

First, an apparatus and method for predicting performance attributable to the parallelization of hardware acceleration devices in accordance with embodiments of the present invention will be described in brief below.

The present invention proposes an apparatus and method for predicting performance attributable to the parallelization of hardware acceleration devices, which are capable of predicting expected performance when parallelized real-time processing is performed on data using hardware acceleration devices or are capable of obtaining the degree of parallelization to be achieved in the hardware acceleration devices when target performance is fixed. Here, Amdahl's law, which is a law governing parallelization performance, is used to implement the apparatus and method for predicting performance attributable to the parallelization of hardware acceleration devices. For this purpose, in the present invention, the entire task is divided into software task parts to be performed by a CPU and parts to be performed by hardware acceleration devices, a performance index is obtained in each part, and a value is obtained by substituting the calculated performance index to Amdahl's law.

From the point of view of the time it takes to perform the entire task J, the time is divided into (1) a stage from the start up to a module to be parallelized, (2) a stage in which the module to be parallelized is performed by a CPU, and (3) a completion stage after the module to be parallelized, and each of the stages is considered to be a basic execution process of a software method.

Furthermore, if the module to be parallelized is performed by hardware acceleration devices, the stage (2) of the task J may be configured to be divided into (2-1) a stage in which the hardware acceleration devices are prepared for a parallelization process, (2-2) a stage in which the module to be parallelized is executed by the hardware acceleration devices, and (2-3) a stage in which the results of the execution are transferred to memory controlled by the CPU. This task is referred to as a task JP.

In this case, an improvement in performance using a basic hardware acceleration device is (TIME(J)/TIME(JP))*100. In this case, TIME(x) is the time it takes to process a task x.

A designer obtains higher performance by performing parallelization, that is, the function of the hardware acceleration devices, on the module to be executed in the stage (2-2). In this case, the term "parallelization" means that a target module is implemented in several (i.e., N) hardware acceleration devices and implemented modules are performed at the same time.

In a conventional art, a developer builds N actual hardware acceleration devices, and achieves an improvement in performance attributable to parallelization processing via a repetitive task of actually measuring parallelization processing and performing a test based on the measured performance. In this conventional method, a lot of time and effort are required because the implementation, test and actual measurement stages should be repeatedly performed.

In the present invention, however, if a developer attempts to implement a target module to be parallelized in the form of a plurality of modules and perform parallelization on the implemented modules, an improvement in performance can be predicted using Amdahl's law even when all the modules are not actually implemented.

In this case, the performance predicted by the present invention is as follows. Since the stage (2-2) is simultaneously processed in a parallel manner in the N hardware acceleration devices, TIME(2-2)=TIME(2-2)/N, resulting in TIME JP=TIME(1)+TIME(2-1)+TIME(2-2)/N+TIME(2-3)+TIME(3). In this case, an improvement in performance attributable to parallelization may be predicted by substituting this value and the time it takes to perform each part into Amdahl's law.

Figure 2:
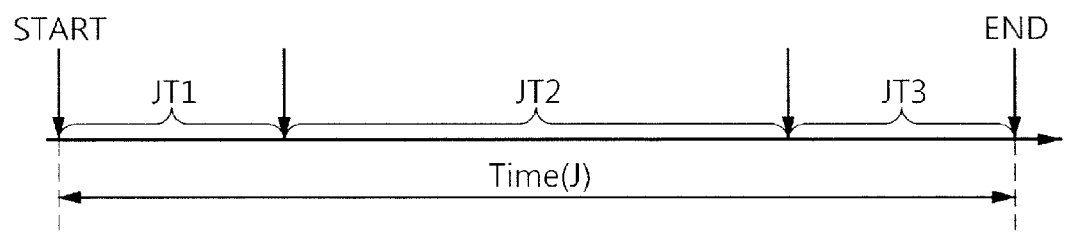
FIGS. 2 and 3 are diagrams illustrating the setting unit of FIG. 1.
Figure 3:
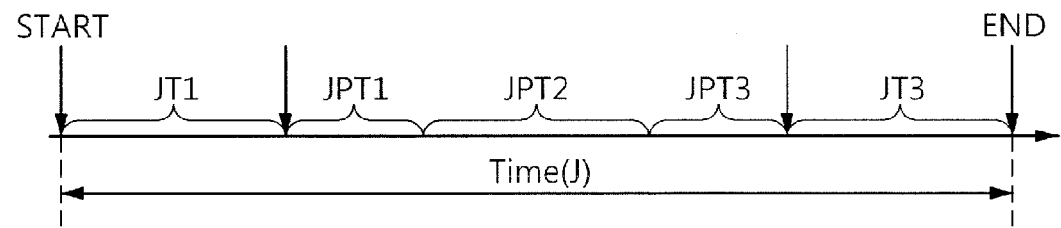

An apparatus for predicting performance attributable to the parallelization of hardware acceleration devices in accordance with an embodiment of the present invention will be described in detail below with reference to FIGS. 1 and 2. FIG. 1 is a block diagram illustrating an apparatus for predicting performance attributable to the parallelization of hardware acceleration devices in accordance with an embodiment of the present invention, and FIGS. 2 and 3 are diagrams illustrating the setting unit of FIG. 1.

As shown in FIG. 1, the apparatus 100 for predicting performance attributable to the parallelization of hardware acceleration devices includes a setting unit 120, an operation unit 140, a prediction unit 160, and an output unit 180.

The setting unit 120 divides the time it takes to perform a task J into a plurality of task stages based on a target module to be parallelized. That is, as shown in FIG. 2, the setting unit 120 divides the entire time Time(J) it takes to perform the task J into task stages: a pre-parallelization stage JT1 that is the time from the start before the target module on which parallelization processing will be performed, a parallelization stage JT2 that is the time in which the target module to be parallelized is processed by a CPU, and a post-parallelization stage JT3 that is the time after the processing of the target module to be parallelized up to the termination of the task.

The setting unit 120 divides the parallelization stage JT2 of the plurality of previously divided stages into a plurality of processing stages. That is, as shown in FIG. 3, in order to perform parallelization processing, the setting unit 120 divides the parallelization stage JT2 into a plurality of processing stages: an initialization stage JPT1 in which hardware acceleration devices are prepared for the parallelization processing, a performance stage JPT2 in which the parallelization processing is performed by the hardware acceleration device, and a post-processing stage JPT3 in which the results of the parallelization processing in the performance stage are transmitted to a CPU. In this case, if the parallelization stage JT2 is processed by a plurality of hardware acceleration devices, the entire time it takes to perform the entire task J is denoted by Time JP.

The setting unit 120 sets a parallelization index N for the parallelization stage JT2. That is, in order to predict performance attributable to parallelization processing, the setting unit 120 sets the number of hardware acceleration devices that will process the parallelization stage, as the parallelization index N. In this case, the setting unit 120 may receive the parallelization index N from a designer. That is, the setting unit 120 receives the parallelization index N from a designer in order to predict an improvement in performance in the case where parallelization processing is performed using hardware acceleration devices, the number of which is requested by the designer.

The setting unit 120 may set target performance E for the parallelization stage JT2. That is, the setting unit 120 sets target performance E, that is, a target improvement in performance via the parallelization processing. In this case, the setting unit 120 may receive the target performance E from a designer. That is, the setting unit 120 receives the target performance E from a designer in order to calculate the number of hardware acceleration devices (i.e., a parallelization index) that will be provided in order to achieve the target performance E that is requested by the designer.

The operation unit 140 calculates the time it takes to perform each of the plurality of task stages that are divided by the setting unit 120. That is, the operation unit 140 calculates the time it takes to perform the pre-parallelization stage JT1, the time it takes to perform the parallelization stage JT2, and the time it takes to perform the post-parallelization stage JT3.

The operation unit 140 calculates the ratio of the parallelization stage F in the task J based on the calculated times it takes to perform the task stages. That is, the operation unit 140 calculates the ratio of the parallelization stage JT2 in the task J by substituting the time it takes to perform the pre-parallelization stage, the time it takes to perform the parallelization stage, and the time it takes to perform the post-parallelization stage into the following Equation 1:

$$F = \frac{JT2}{JT1 + JT2 + JT3} \quad (1)$$

In Equation 1, F is the ratio of the parallelization stage JT2 in the task J, JT1 is the time it takes to perform the pre-parallelization stage, JT2 is the time it takes to perform the parallelization stage, and JT3 is the time it takes to perform the post-parallelization stage.

The operation unit 140 calculates the time it takes to perform each of the plurality of processing stages JPT1, JPT2, and JPT3 that are divided by the setting unit 120. That is, the operation unit 140 calculates the time it takes to perform the initialization stage, the time it takes to perform the performance stage, and the time it takes to perform the post-processing stage.

The operation unit 140 calculates a speed improvement value S using the parallelization index N that are set by the setting unit 120 and the previously calculated times it takes to perform the plurality of processing stages. That is, the operation unit 140 calculates the speed improvement value S by substituting the time it takes to perform the initialization stage, the time it takes to perform the performance stage, the time it takes to perform the post-processing stage, and the parallelization index N into the following Equation 2:

$$S = JPT1 + JPT3 + \frac{JPT2}{N} \quad (2)$$

In Equation 2, S is a speed improvement value, JPT1 is the time it takes to perform the initialization stage, JPT2 is the time it takes to perform the performance stage, JPT3 is the time it takes to perform the post-processing stage, and N is the parallelization index.

The prediction unit 160 calculates an expected performance value E based on the speed improvement value and the ratio of the parallelization stage in the task J that are calculated by the operation unit 140. That is, the prediction unit 160 calculates the expected performance value E by substituting the speed improvement value S and the ratio of the parallelization stage F in the task J into the following Equation 3 (i.e., Amdahl's law):

$$E = \frac{1}{(1-F) + \frac{F}{S}} \quad (3)$$

In Equation 3, E is the expected performance value.

The prediction unit 160 may calculate the parallelization index N based on the times it takes to perform the plurality of processing stages and the ratio of the parallelization stage F in the task J, which are calculated by the operation unit 140, and the target performance E. That is, the prediction unit 160 calculates the parallelization index N by substituting the times it takes to perform the plurality of processing stages, the ratio of the parallelization stage F in the task J, and the target performance E into the following Equation 4:

$$N = \frac{JPT2}{\frac{F}{\frac{1}{E} - (1-F)} - (JPT1 + JPT3)} \quad (4)$$

In Equation 4, N is the parallelization index, E is the target performance, F is the ratio of the parallelization stage in the task J, JPT1 is the time it takes to perform the initialization stage, JPT2 is the time it takes to perform the performance stage, and JPT3 is the time it takes to perform the post-processing stage.

The output unit 180 outputs the expected performance value and the parallelization index N that are calculated by the prediction unit 160. That is, the output unit 180 displays the expected performance value or the parallelization index on a screen, or outputs the expected performance value or the parallelization index to a real-time data processing system.

Figure 4:
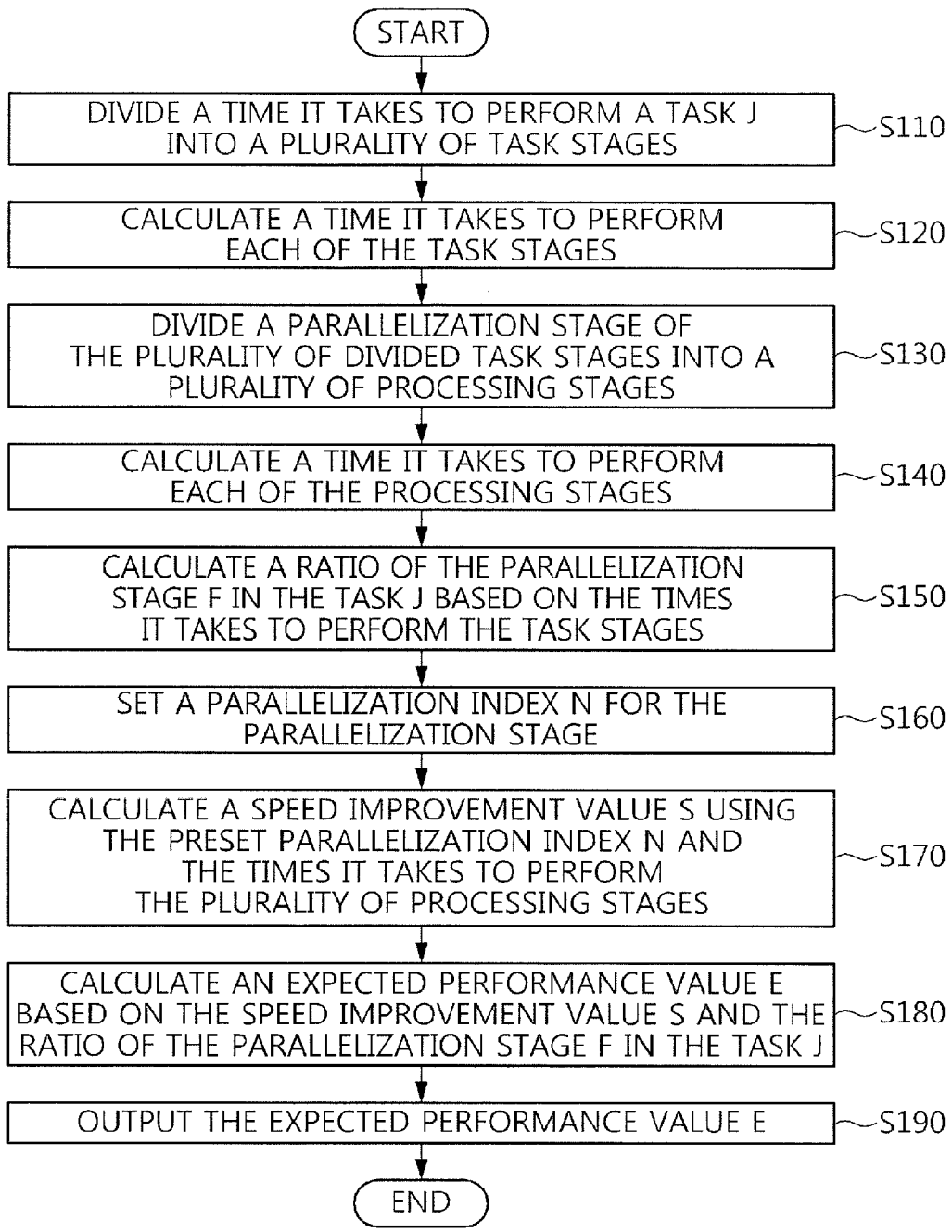
FIG. 4 is a flowchart illustrating a method of predicting performance attributable to the parallelization of hardware acceleration devices in accordance with an embodiment of the present invention.

A method of predicting performance attributable to the parallelization of hardware acceleration devices in accordance with an embodiment of the present invention will be described in detail below with reference to the accompanying drawings. FIG. 4 is a flowchart illustrating the method of predicting performance attributable to the parallelization of hardware acceleration devices in accordance with this embodiment of the present invention.

First, the setting unit 120 divides the time it takes to perform a task J into a plurality of task stages based on a target module to be parallelized at step S110. Here, the setting unit 120 divides the time it takes to perform the task J into a pre-parallelization stage, a parallelization stage, and a post-parallelization stage.

The operation unit 140 calculates the time it takes to perform each of the task stages, which are divided at step S110, at step S120. That is, the operation unit 140 calculates the time it takes to perform the pre-parallelization stage, the time it takes to perform the parallelization stage, and the time it takes to perform the post-parallelization stage.

The setting unit 120 divides the parallelization stage of the plurality of divided task stages into a plurality of processing stages at step S130. That is, the setting unit 120 divides the parallelization stage into an initialization stage, a performance stage, and a post-processing stage.

The operation unit 140 calculates the time it takes to perform each of the processing stages, which are divided at step S130, at step S140. That is, the operation unit 140 calculates the time it takes to perform the initialization stage, the time it takes to perform the performance stage, and the time it takes to perform the post-processing stage.

The operation unit 140 calculates the ratio of the parallelization stage F in the task J based on the times it takes to perform the task stages, which are calculated at step S120, at step S150. That is, the operation unit 140 calculates the ratio of the parallelization stage F in the task J using the time it takes to perform the pre-parallelization stage, the time it takes to perform the parallelization stage, and the time it takes to perform the post-parallelization stage.

The setting unit 120 sets a parallelization index N for the parallelization stage at step S160. That is, the setting unit 120 sets the number of hardware acceleration devices that will process the parallelization stage as the parallelization index. In this case, the setting unit 120 may receive the parallelization index from a designer.

The operation unit 140 calculates a speed improvement value S using the preset parallelization index N and the times it takes to perform the plurality of processing stages, which are calculated at step S140, at step S170. That is, the operation unit 140 calculates the speed improvement value S based on the time it takes to perform the initialization stage, the time it takes to perform the performance stage, the time it takes to perform the post-processing stage, and the parallelization index N.

The prediction unit 160 calculates an expected performance value E based on the speed improvement value S and the ratio of the parallelization stage F in the task J at step S180. That is, the prediction unit 160 calculates the expected performance value E by substituting the ratio of the parallelization stage F in the task J and the speed improvement value S into Amdahl's law.

The output unit 180 outputs the expected performance value E calculated by the prediction unit 160 at step S190. That is, the output unit 180 displays the expected performance value E on a screen, or outputs the expected performance value E to a real-time data processing system.

Figure 5:
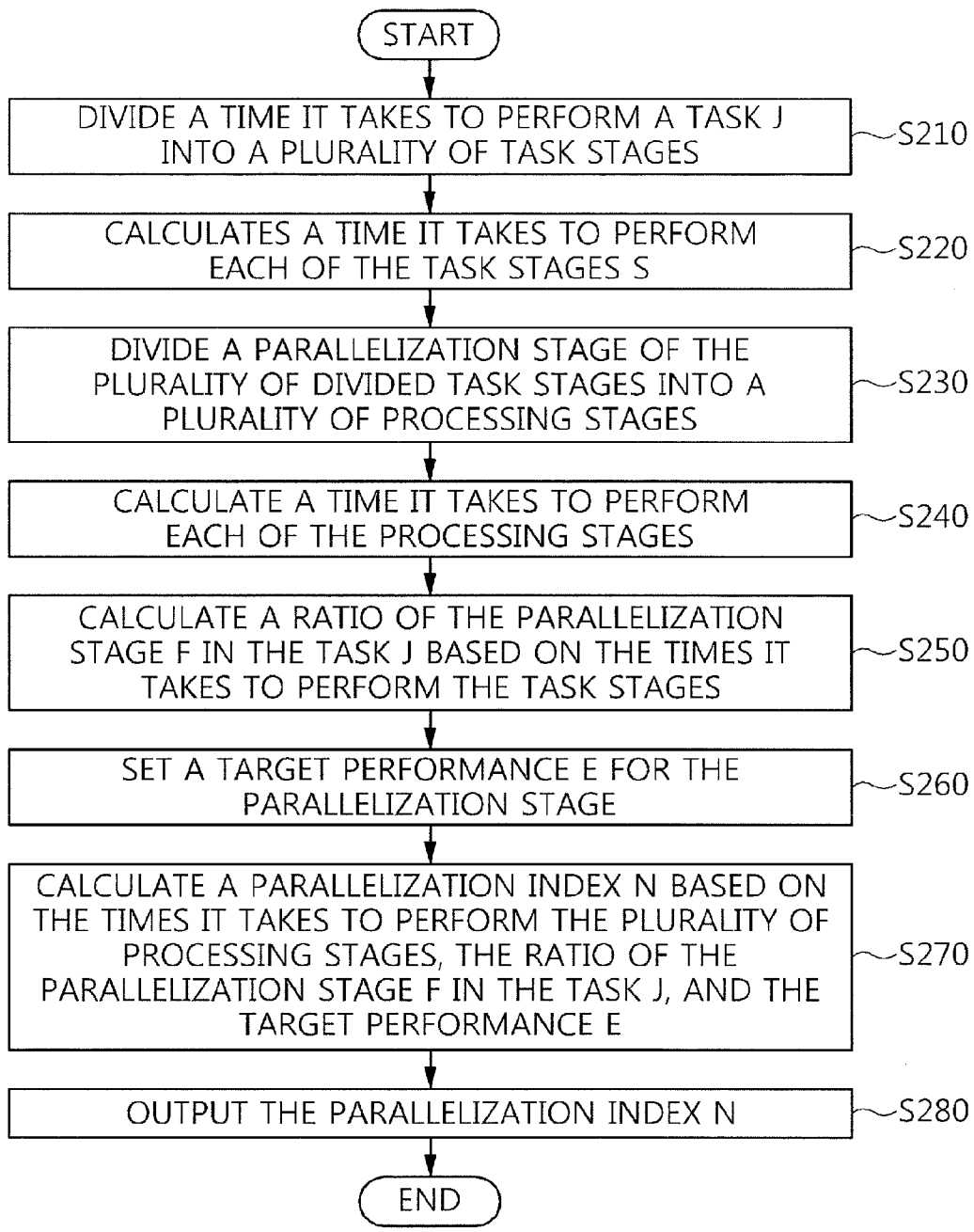
FIG. 5 is a flowchart illustrating a method of predicting performance attributable to the parallelization of hardware acceleration devices in accordance with another embodiment of the present invention.

A method of predicting performance attributable to the parallelization of hardware acceleration devices in accordance with another embodiment of the present invention will be described in detail below with reference to the accompanying drawing. FIG. 5 is a flowchart illustrating the method of predicting performance attributable to the parallelization of hardware acceleration devices in accordance with the other embodiment of the present invention.

First, the setting unit 120 divides the time it takes to perform a task J into a plurality of task stages based on a target module to be parallelized at step S210. Here, the setting unit 120 divides the time it takes to perform the task J into a pre-parallelization stage, a parallelization stage, and a post-parallelization stage.

The operation unit 140 calculates the time it takes to perform each of the task stages, which are divided at step S210, at step S220. That is, the operation unit 140 calculates the time it takes to perform the pre-parallelization stage, the time it takes to perform the parallelization stage, and the time it takes to perform the post-parallelization stage.

The setting unit 120 divides the parallelization stage of the plurality of divided task stages into a plurality of processing stages at step S230. That is, the setting unit 120 divides the divided parallelization stage into an initialization stage, a performance stage, and a post-processing stage.

The operation unit 140 calculates the time it takes to perform each of the processing stages, divided at step S230, at step S240. That is, the operation unit 140 calculates the time it takes to perform the initialization stage, the time it takes to perform the performance stage, and the time it takes to perform the post-processing stage.

The operation unit 140 calculates the ratio of the parallelization stage F in the task J based on the times it takes to perform the task stages, which are calculated at step S220, at step S250. That is, the operation unit 140 calculates the ratio of the parallelization stage F in the task J by substituting the time it takes to perform the pre-parallelization stage, the time it takes to perform the parallelization stage, and the time it takes to perform the post-parallelization stage into Equation 1 (refer to the first embodiment).

The setting unit 120 sets target performance E for the parallelization stage at step S260. That is, the setting unit 120 sets the target performance E, that is, a target improvement in performance via the parallelization processing. In this case, the setting unit 120 may receive the target performance E from a designer.

The prediction unit 160 calculates a parallelization index N based on the times it takes to perform the plurality of processing stages, which are calculated at step S240, the ratio of the parallelization stage F in the task J, and the target performance E at step S270. That is, the prediction unit 160 calculates the parallelization index N using the times it takes to perform the plurality of processing stages, the ratio of the parallelization stage F in the task J, and the target performance E.

The output unit 180 outputs the parallelization index N, which is calculated by the prediction unit 160, at step S280. That is, the output unit 180 displays the parallelization index N on a screen, or outputs the parallelization index N to a real-time data processing system.

In accordance with the present invention, the apparatus and method for predicting performance attributable to the parallelization of hardware acceleration devices have the following advantages with regard to system implementation using hardware acceleration devices.

First, when a specific module is implemented in a hardware acceleration device, a functional module is first completed and then a plurality of functional modules is repeatedly and physically arranged, thereby implementing parallelization. In this case, there is an advantage in that it is possible to predict a final improvement in performance even when only one function has been implemented before a plurality of functions is actually implemented and executed.

Second, there is an advantage in that it is possible to predict the number of functional modules that are required to be actually and physically parallelized in order to achieve a final target improvement in performance. That is, there is an advantage in that it is possible to predict the number of modules to be physically parallelized to achieve a final target improvement in performance in the state in which only one module has been implemented in a hardware acceleration device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for predicting performance attributable to parallelization of hardware acceleration devices, comprising:
   a processor coupled to a memory;
   a setting unit configured to divide a time it takes to perform a task into a plurality of task stages and a plurality of processing stages and to set one of a parallelization index and a target performance;
   an operation unit configured to calculate a time it takes to perform each of the plurality of task stages and the plurality of processing stages, and to calculate at least one of a ratio of a target parallelization stage in the task and a speed improvement value using the calculated times; and
   a prediction unit configured to calculate an expected performance value or a parallelization index using at least one of the calculated times it takes to perform the plurality of task stages and the plurality of processing stages, the calculated ratio of the target parallelization stage, the calculated speed improvement value, and the set target performance, wherein the setting unit provisions a number of hardware acceleration devices using the parallelization index to achieve the expected performance value or using the parallelization index to achieve the set target performance.

2. The apparatus of claim 1, wherein the operation unit calculates the ratio of the target parallelization stage in the task using the calculated times it takes to perform the plurality of task stages.

3. The apparatus of claim 1, wherein the operation unit calculates the speed improvement value using the set parallelization index and the previously calculated times it takes to perform the plurality of processing stages.

4. The apparatus of claim 1, wherein the prediction unit calculates the expected performance value using the calculated ratio of the target parallelization stage and the calculated speed improvement value.

5. The apparatus of claim 1, wherein the prediction unit calculates the parallelization index using the calculated times it takes to perform the plurality of processing stages, the calculated ratio of the target parallelization stage, and the set target performance.

6. The apparatus of claim 1, wherein the setting unit divides the time it takes to perform the task into the plurality of task stages, comprising a pre-parallelization stage, a parallelization stage, and a post-parallelization stage.

7. The apparatus of claim 6, wherein the setting unit divides the parallelization stage into the plurality of processing stages, comprising an initialization stage, a performance stage, and a post-processing stage.

8. The apparatus of claim 1, wherein the setting unit sets a number of hardware acceleration devices that process the target parallelization stage as the parallelization index.

9. A method of predicting performance attributable to parallelization of hardware acceleration devices, comprising:
   dividing, by a setting unit, a time it takes to perform a task into a plurality of task stages and processing stages, wherein one of the task stages is a target parallelization stage and one of the processing stages is a performance stage;
   calculating, by an operation unit, a time it takes to perform each of the plurality of divided stages;
   calculating, by the operation unit, a ratio of the target parallelization stage in the task by dividing the time it takes to perform the target parallelization stage by the total amount of time it takes to perform the plurality of task stages;
   setting, by the setting unit, a parallelization index for the target parallelization stage;
   calculating, by the operation unit, a speed improvement value by dividing the time it takes to perform the performance stage by the parallelization index and adding the result to the time it takes to perform the remaining processing stages of the target parallelization stage;
   calculating, by a prediction unit, an expected performance value using the calculated ratio of the target parallelization stage in the task and the calculated speed improvement value; and
   provision a number of hardware acceleration devices using the parallelization index to achieve the expected performance value.

10. The method of claim 9, wherein dividing the time it takes to perform the task into the plurality of stages comprises dividing, by the setting unit, the time it takes to perform the task into a plurality of task stages, further comprising a pre-parallelization stage and a post-parallelization stage.

11. The method of claim 10, wherein calculating the ratio of the target parallelization stage comprises calculating, by the operation unit, the ratio of the target parallelization stage in the task using a time it takes to perform the pre-parallelization stage, a time it takes to perform the target parallelization stage, and a time it takes to perform the post-parallelization stage.

12. The method of claim 10, wherein dividing the time it takes to perform the task into the plurality of stages comprises dividing, by the setting unit, the target parallelization stage into a plurality of processing stages, further comprising an initialization stage and a post-processing stage.

13. The method of claim 12, wherein calculating the speed improvement value comprises calculating, by the operation unit, the speed improvement value using a time it takes to perform the initialization stage, a time it takes to perform the performance stage, a time it takes to perform the post-processing stage, and the set parallelization index.

14. The method of claim 9, wherein setting the parallelization index comprises setting, by the setting unit, a number of hardware acceleration devices that perform the target parallelization stage of the plurality of divided stages as the parallelization index.

15. The method of claim 9, wherein calculating the expected performance value comprises calculating, by the prediction unit, the expected performance value by substituting the calculated ratio of the target parallelization stage and the calculated speed improvement value into Amdahl's law.

16. A method of predicting performance attributable to parallelization of hardware acceleration devices, comprising:
   dividing, by a setting unit, a time it takes to perform a task into a plurality of stages, wherein one of the stages is a target parallelization stage;
   calculating, by an operation unit, a time it takes to perform each of the plurality of divided stages;
   calculating, by the operation unit, a ratio of the target parallelization stage in the task by dividing the time it takes to perform the target parallelization stage by the total amount of time it takes to perform the plurality of stages of the task;

setting, by the setting unit, a target performance for the target parallelization stage;

calculating, by a prediction unit, a parallelization index using the set target performance, the calculated times it takes to perform the stages of the task, and the calculated ratio of the target parallelization stage; and provision a number of hardware acceleration devices using the parallelization index to achieve the set target performance.

17. The method of claim 16, wherein dividing the time it takes to perform the task into the plurality of stages comprises dividing, by the setting unit, the time it takes to perform the task into a plurality of task stages, further comprising a pre-parallelization stage and a post-parallelization stage.

18. The method of claim 17, wherein calculating the ratio of the target parallelization stage comprises calculating, by the operation unit, the ratio of the target parallelization stage in the task using a time it takes to perform the pre-parallelization stage, a time it takes to perform the target parallelization stage, and a time it takes to perform the post-parallelization stage.

19. The method of claim 17, wherein dividing the time it takes to perform the task into the plurality of stages comprises dividing, by the setting unit, the target parallelization stage into a plurality of processing stages, comprising an initialization stage, a performance stage, and a post-processing stage.

20. The method of claim 19, wherein calculating the parallelization index comprises calculating, by the prediction unit, the parallelization index by substituting a time it takes to perform the initialization stage, a time it takes to perform the performance stage, a time it takes to perform the post-processing stage, the ratio of the target parallelization stage, and the target performance into Amdahl's law.

\* \* \* \* \*